Patented May 4, 1937

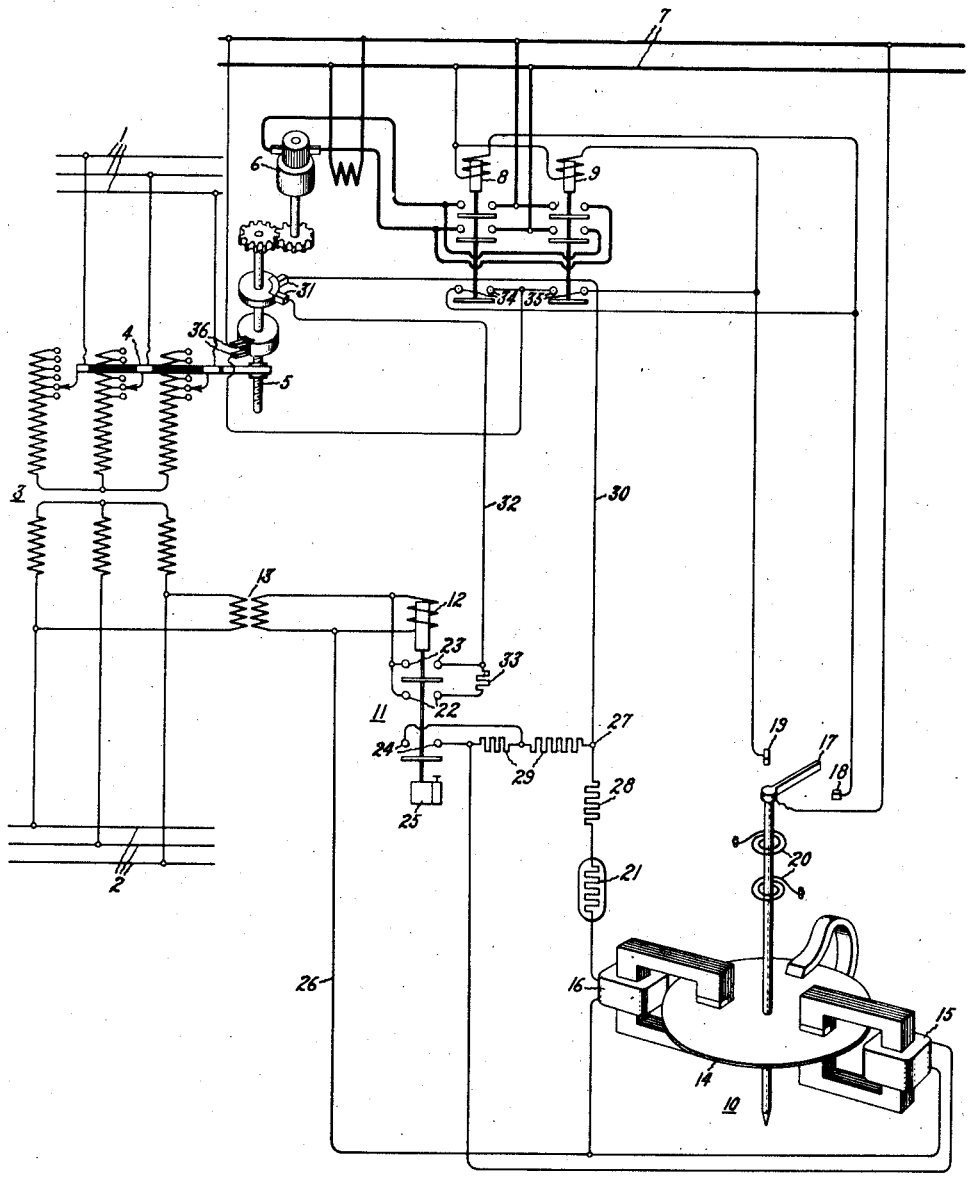

2,079,492

UNITED STATES PATENT OFFICE 2,079,492

ELECTRICAL REGULATING SYSTEM

Eberhard Courtin, Berlin-Lankwitz, Germany, assignor to General Electric Company, a corporation of New York Application August 23, 1934, Serial No. 741,163
In Germany August 23, 1933

6 Claims. (Cl. 171—119)

My invention relates to electrical regulating systems and more particularly to improvements in the control of automatic electrical regulating systems.

In many automatic electrical regulating systems it is desirable to introduce a time delay in the control for the system so as to prevent needless operation of the mechanism of the system in response to but momentary fluctuations in the regulated condition or quantity. This is particularly true in relatively large and complicated motor operated regulators, such as motor operated tap changing transformers. Furthermore, it is desirable to have the time delay vary substantially inversely with the degree or magnitude of the deviation of the regulated condition from a predetermined normal value, so that for large deviations the time delay is short and the regulation takes place quickly, whereas for relatively small deviations, which it is not so important to correct at once, the time delay is longer. Thus if the relatively small deviations disappear in themselves during the period of the time delay, the regulator need not operate. However, it is also desirable to limit the time delay to a definite maximum so that for deviations sufficiently serious to require regulation a correction will take place within a definite time.

In accordance with my invention I provide a novel regulator control system for producing the above desirable results. Briefly, this regulating system comprises a master circuit controller for controlling a time delay relay, which latter in turn controls the regulating system. For a regulating system which operates in steps, the master circuit controller, which responds to the regulated condition, is so calibrated or adjusted that it only responds to deviations in the regulated condition which exceed a regulating step, for only in this manner can objectionable hunting of the system be avoided. In addition I provide my system with suitable interlocks so that after the time delay relay sends a control impulse to the regulating means for starting the latter, one interlock serves to deenergize the time delay relay, while the other interlock serves to continue the regulating action for a complete regulating step, regardless of the deenergization of the time delay relay. In this manner, over-regulation is avoided and the time delay relay is reset in its normal position so as to be ready again to perform its time delay function at the end of each regulating step.

An object of my invention is to provide a new and improved electrical regulating system.

A further object of my invention is to provide a new and improved regulator control system, for motor operated step type regulators, in which an inverse time delay is introduced.

My invention will be better understood from the following description taken in connection with the accompanying drawing and its scope will be pointed out in the appended claims.

The single figure of the accompanying drawing illustrates an embodiment of my invention as applied to an automatic voltage regulating system for controlling a motor operated tap changing transformer. Referring now to this figure, I have shown an alternating current power supply circuit 1, and a load circuit 2, which are interconnected by a power transformer 3 having tap changing mechanism 4 which is operated through suitable mechanical driving means 5 by a motor 6, whose field winding is connected to be energized from a suitable supply circuit 7 and whose armature is controlled by suitable reversing contactors or relay means 8 and 9. Means 8 and 9 are controlled by a time delay relay 10 which in turn is controlled in response to the voltage of load circuit 2 by means of a voltage sensitive relay or contact making voltmeter 11, having an energizing winding 12 connected across the circuit 2 through a potential transformer 13.

Time delay relay 10 comprises an induction type relay having a disk 14 and oppositely acting shaded pole operating elements 15 and 16. This relay also has a movable contact 17 for cooperation with stationary contacts 18 and 19 and it is provided with biasing or centering springs 20 for normally maintaining the movable contact 17 midway between the stationary contacts 18 and 19, when the relay is deenergized. The operating element 16 is adapted to be energized by a constant current and in order to secure this energization I provide in series therewith a ballast resistor 21 which has the well-known property of passing substantially constant current over a considerable range of variations in the voltage applied to the circuit containing it. The operating element 15 is energized in accordance with variations in the voltage of the circuit 2, in a manner to be described later. The operating elements produce opposed torques and, as shown in the drawing, the torque of element 16 tends to produce counterclockwise rotation of the disk 14 and the torque of operating element 15 tends to produce clockwise rotation of this disk. The stationary contacts 18 and 19 of the relay 10 are connected respectively to the motor control relays 8 and 9. The other terminals of these relays are connected together to one side of the supply circuit 7 while the movable contact 17 is connected to the other side of the supply circuit.

The master control relay 11 is provided with a set of "raise" contacts 22 which close when the voltage of circuit 2 falls below a predetermined normal value by an amount slightly exceeding one half the voltage change produced by one tap change on the transformer. The relay 11 is also provided with two sets of "lower" contacts 23 and 24 which are closed when the voltage of circuit 2 exceeds a predetermined normal value by an amount slightly exceeding one half the voltage change produced by one tap change on the transformer 3. The relay 11 is also provided with a motion damping dashpot 25 for preventing chattering thereof and for preventing closure of its contacts on slight transient voltage changes.

As shown, the operating elements 15 and 16 of time delay relay 10 are both connected to one side of the transformer 13 by means of a conductor 26. These two operating elements are energized in parallel and their other terminals are joined at a point 27. In addition to the ballast resistor 21 the operating element 16 also has in series therewith a second resistor 28, while the operating element 15 has in series therewith a resistor 29, part of which is adapted to be short circuited by the set of "lower" contacts 24 of the contact making voltmeter 11. The energizing circuit for the operating elements continues from point 27 through a conductor 30 and through an electro-mechanical interlocking switch 31, on the operating means 5 for the tap changer. The circuit is then continued through a conductor 32 directly to one of the "lower" contacts 23, and through a resistor 33 to one of the "raise" contacts 22. The purpose of short circuiting the left-hand portion of resistor 29 by contacts 24 and the purpose of resistor 33 is to insure a predetermined minimum difference in the energization of the operating elements 15 and 16 of the relay 10, so as to insure a definite maximum time delay in the operation of this relay whenever the contact making voltmeter is actuated. This will be explained more fully hereinafter.

The purpose of the interlock 31 is to permit the time delay relay 10 to be reset to its mid-position, so that this relay will be ready to function again and produce the proper inverse time delay for another step of regulation. In order to make this operation possible, however, it is necessary to provide additional interlocking means for maintaining the relay means 8 and 9 energized after an initial control impulse has caused them to start the operating motor 6. As shown, this interlocking means comprises interlock switch contacts 34 and 35 on the relays 8 and 9, respectively, and a switch member 36 carried by the operating means 5 for the tap changer. This switch 36 is closed in all positions except when the tap changer is directly on one of the taps. As shown, a circuit extends from the upper side of the supply circuit 7 through the switch 36 to an electrically common contact on each of the interlock switches 34 and 35. These switches then connect respectively in parallel with the contacts 18 and 19 of the relay 10, so that whenever one of the relays 8 or 9 picks up and starts the motor a circuit is completed through the switch 36 and the interlock contacts 34, 35 for maintaining the relay energized until the tap changing operation has been completed when the switch 36 opens and allows the relay 8 or 9 to drop out.

The operation of the illustrated embodiment of my invention is as follows: With the parts in the positions shown in the drawing, the voltage of circuit 2 is normal.

Assume now that the voltage of circuit 2 rises above normal by an amount which is slightly greater than one half the voltage change produced by one tap changing operation. When this occurs the contacts 23 and 24 of the relay 11 close thereby energizing the operating elements 15 and 16 of the time delay relay 10. Due to the fact that part of the resistance 29 is short circuited by the contacts 24 the energization of operating element 15 preponderates over the energization of operating element 16 so that the net operating torque on the disk 14 is counterclockwise. Furthermore, this net operating torque will always be counterclockwise so long as the contacts 23 and 24 are closed, because the amount of resistance 29 which is cut out by the contacts 24 is sufficient to produce this preponderance at any over-voltage sufficient to cause the relay 11 to close its contacts 23 and 24. Consequently, the relay 11 will always close its contacts 17 and 18 in a predetermined maximum time so long as the relay 11 is actuated in the manner described. However, as the current through operating element 16 is maintained constant by the ballast resistor 21, and as the current through the operating element 15 varies in proportion with the voltage of circuit 2, the speed of operation of the disk 14 will be varied in accordance with the voltage of circuit 2. Consequently the time for the contact 17 to engage the contact 18 varies inversely with the voltage rise above normal on circuit 2. As soon as contact 17 engages contact 18 relay 8 is energized thereby completing an energizing circuit for the motor 6 and starting a tap changing operation. At the same time the interlock contacts 34 close and the contacts 36 close before the contacts 31 open thereby completing a holding circuit for the relay 8 before the contacts 31 break the energizing circuit for the relay 10.

The system now goes through a tap changing operation and if this has not been sufficient to restore the voltage to within the normal range as determined by the setting of relay 11, this relay will again cause the energization of time delay relay 10 and another operation will take place as described. If now the voltage of circuit 2 should fall below normal the "raise" contacts 22 will be closed thereby energizing the relay 10 through the resistor 33, which so reduces the energization of operating element 15 that the torque of operation element 16 predominates thereover a sufficient amount to cause contact 17 of relay 10 to engage the contact 19 thereof in a predetermined maximum time. However, the lower the voltage of circuit 2 is, the less the counter-operating torque of element 15 and consequently the quicker contact 17 engages contact 19. The engagement of contacts 17 and 19 energizes the relay 9 which energizes the motor 6 so as to rotate in a reverse direction and cause the tap changer to raise the voltage of circuit 2. The various interlocks also come into play as previously described and maintain the relay 9 energized until the tap changing operation is completed, while at the same time deenergizing relay 10 and allowing it to return to its mid-position.

By suitable adjustment and setting of the contacts 31 they may be made to close before a tap changing operation has been completed so as to start the relay 10 before the tap changing operation has been completed thereby decreasing the time required for a multi-step regulating change.

While I have shown and described a particular embodiment of my invention, it should be obvious to those skilled in the art that changes and modifications may be made without departing from my invention, and I, therefore aim in the appended claims to cover all such changes and modifications as fall within the true spirit and scope of my invention.

What I claim as new and desire to secure by Letters Patent of the United States is:

1. In combination, apparatus having an operating condition to be regulated, a circuit controller responsive to the value of said condition, a time delay relay whose energization is controlled by said circuit controller, said relay being operated by means energized in response to said condition in such a manner that the time delay operation of the relay varies inversely with the deviation from a normal value of said condition, and regulating means for said apparatus controlled by said relay.

2. In a step type regulating system, a circuit controller responsive to deviations from a normal value of a regulated condition which exceed in magnitude a regulating step, and a time delay regulator control relay controlled by said circuit controller, said relay having means for causing its time delay to vary inversely with the magnitude of the deviation of the regulated condition.

3. In a regulating system, a time delay relay of the induction disk type having two opposed normally deenergized operating elements, means for energizing one of said elements with a constant current and means for energizing the other element with a current which varies in accordance with the value of a condition to be regulated.

4. In a regulating system, a time delay relay of the induction disk type having two opposed normally deenergized operating elements, means including a ballast resistor for energizing one of said elements with a constant current, and means for energizing the other element with a current which varies in accordance with the value of a condition to be regulated.

5. In a regulating system, apparatus having a quantity to be regulated, means for regulating said quantity in steps, control means for said regulating means comprising a circuit controller having a set of "lower" contacts which close when said quantity exceeds a given normal value by more than one half a regulating step and having a set of "raise" contacts which close when said quantity is below said normal value by more than one half a regulating step and an induction disk time delay relay having two opposed operating elements, a ballast lamp in series with one of said elements, circuit connections for energizing said elements from a source of potential which varies in accordance with the value of said quantity through said "lower" or "raise" contacts, respectively, said "lower" contacts in addition serving to reduce the resistance of the circuit of the other operating element and said "raise" contacts serving in addition to increase the resistance of the circuit of the other operating element.

6. A regulating system comprising, in combination, an alternating current supply circuit, an alternating current load circuit, a tap changing transformer interconnecting said circuits, motor operated means for actuating the tap changing means of said transformer, relay means for controlling the direction of operation of said motor, said relay means having an interlock whereby after the relay means has been actuated by a control impulse the interlock will maintain it energized for a complete tap changing operation, a contact making voltmeter connected to be responsive to the voltage of one of said circuits and having a set of "raise" contacts and a set of "lower" contacts, a time delay relay having an induction disk and two operating elements arranged to act in opposition on said disk, said time delay relay having a movable contact arranged between two stationary contacts, biasing means for normally centering said movable contact between said stationary contacts, circuit connections for causing the contacts of said time delay relay to control the motor control relay means, means controlled by said contact making voltmeter for energizing one of said time delay relay elements with a constant current and for energizing the other element with a current which is proportional to the voltage of one of said circuits, and means controlled by said motor operated means for deenergizing said element during a tap changing operation.

EBERHARD COURTIN.